W. TRAFFORD.
SEAM CUTTING DEVICE.
APPLICATION FILED MAY 14, 1907.
934,585.
Patented Sept. 21, 1909.
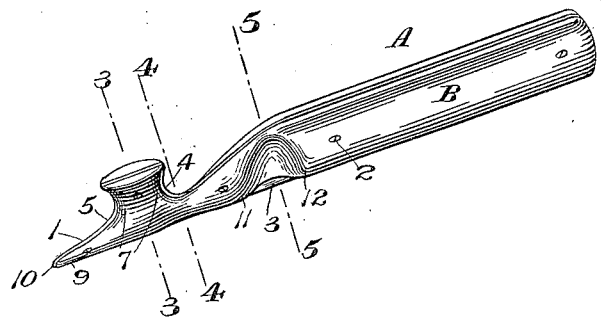
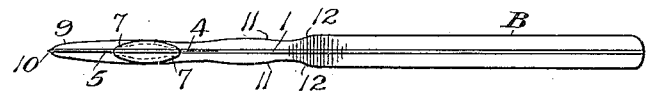
  
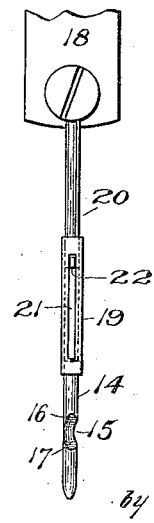

UNITED STATES PATENT OFFICE.

WESLEY TRAFFORD, OF NEW YORK, N. Y.

SEAM-CUTTING DEVICE.

934,585.    Specification of Letters Patent.   Patented Sept. 21, 1909.

Application filed May 14, 1907. Serial No. 373,591.

*To all whom it may concern:*

Be it known that I, WESLEY TRAFFORD, a citizen of the United States, residing at New York city, county of New York, and State of New York, have invented certain new and useful Improvements in Seam-Cutting Devices, fully described and represented in the following specification and the accompanying drawings, forming a part of the same.

This invention relates to improvements in cutting or ripping devices of that class known as seam cutters, and the invention has for one object to produce a cutter which may be used for cutting or ripping any seam or stitch, the cutter being so constructed that the cutting edge or edges are kept out of contact with the material which is to be operated on, the layers of such material being spread apart in the line of cut and pushed aside from the cutting edge.

A further object of the invention is to produce such a device which shall be cheap, simple to use and durable.

For a better understanding of the invention, reference will now be had to the accompanying drawing, in which—

Figure 1 is a view in perspective of the improved seam ripper; Fig. 2 is a plan view of the device shown in Fig. 1; Fig. 3 is a section on line 3—3 of Fig. 1; Fig. 4 is a section on line 4—4 of Fig. 1; Fig. 5 is a section taken on line 5—5 of Fig. 1, and, Fig. 6 is a view of a modified form of the device which is adapted to be used for ripping in a sewing machine.

Referring now to Figs. 1 to 5 of the drawings, which illustrate a preferred embodiment of the invention, the improved seam cutting device is indicated generally by the character A, and comprises a knife 1 made of any suitable material, as tempered steel, capable of taking a sharp cutting edge, and a handle or holder B, in which the knife is held or mounted. This handle or holder may be made of any suitable material, preferably some cheap metal, as ordinary soft steel, this material being chosen because of its cheapness and durability. The knife 1 is secured in this handle in any suitable manner, as by screws 2.

The knife 1 which forms the cutting element of the device may have varied configurations. In the preferred form, and as shown, the knife is provided with a plurality of cutting edges, which cutting edges rip or cut the seam in the material to be operated on, these cutting edges having a certain arrangement in the handle with respect to each other, the purpose of which is more fully described hereinafter.

The means provided by the present invention by which the material to be operated on is spread or pushed aside on the stitch line out of the path of the cutting edges, so that the cutting edges will not touch the material on either side of the line of cut may be somewhat varied. In the particular construction shown there is provided for this purpose spreading shoulders, such spreading shoulders being provided for each of the cutting edges of the knife 1. These spreading shoulders are formed preferably on the handle B and have beveled faces 7, beveled toward the cutting edge, thus forming wedge-shaped projections at the sides of the edge, these wedges being formed behind the cutting edges so that they spread or throw aside the material as it comes to the cutting edge and by their wedging action effectively prevent the knife from cutting or injuring the material.

As before stated, a plurality of cutting edges are provided by the present invention, the particular number of which may be varied. As shown, there are three of these cutting edges, 3, 4 and 5, this number having been found in practice to be sufficient to cut any ordinary seam or stitch. These cutting edges are also preferably positioned as shown, two of the cutting edges, as 4, 5, extending transversely to the handle of the instrument and facing in opposite directions, and being preferably concave, as shown in Fig. 1, and the third cutting edge 3 (the function of which will be hereinafter described) extending longitudinally of the handle of the instrument. With the cutting faces thus positioned, the cutter may be used in any direction, either by being pushed forward, away from the operator, when the cutting edge 5 would come into play, or by being pulled toward the operator, when the cutting edge 4 would come into play, the seam cutting device being held either in a line parallel with the seam, or in a line diagonal or transverse thereto. When the cutting edges 4, 5 are thus positioned, the beveled faces of the spreading shoulders 7 are given the configuration shown in Fig. 3, that is to say, being thicker at their top and bottom than in the center, as shown at 8, so that when the cutter is laid flatwise between the layers of the material and drawn or pushed against the seam while held in a position diagonal or transverse thereto, the middle portion of the spreading shoulders act to spread or throw apart the material on the seam line, while the upper and lower portions of the shoulders serve as guides for guiding and holding the cutting edge against the seam. The concave form of the cutting edge also aids in guiding and holding the edge in position during the cutting operation.

In the construction shown, the lower part of the shoulders, which are provided for the cutting edge 5, are prolonged somewhat beyond the upper portion forming a projection 9, this projection forming a guide for inserting the implement in the seam or the beginning of the cutting operation. The knife 1 is likewise formed with a portion extending beyond the cutting edge 5, as shown in Fig. 1, forming a nicking point 10, the object of this construction being to provide a means by which the first stitches of a seam may be cut in order to permit the cutter to be readily inserted in the seam.

With the cutter as so far described, the stitching of the seam is cut by pulling or pushing the cutting edges against the seam, the implement being held in a line either parallel with the seam, or in a line diagonal or transverse to the seam stitching that is to be cut. It frequently happens that in cutting seams some seams cannot be cut in this manner, as for instance in seams formed with heavy threads or where two seams cross each other. In such circumstance, it is desirable to have the device so constructed that a knife edge may be presented against the stitching in a line vertical to the stitching, the cutter being held in a vertical position and reciprocated up and down against the seam with a saw-like motion. The present invention provides a means for accomplishing this result. In the particular construction shown, this function is performed by the cutting edge 3, this cutting edge 3 extending longitudinally of the instrument and being located in the preferred form of the instrument shown, at the bottom of the knife blade, although obviously it might be located on either edge of the blade. This cutting edge 3 is, like the cutting edges 4, 5 hereinbefore described, provided with spreading shoulders for spreading or throwing apart the material out of the path of the cutting edge so that it will not be cut or injured thereby. The handle B is so shaped as to provide these shoulders, which in this instance are two in number, one on each side of the cutting edge, these shoulders having beveled faces 11, 12, beveled toward the knife edge, thus forming a wedge, one of these wedges being formed at each end of the cutting knife, as shown in Fig. 1. These beveled faces 11, 12 of the shoulders spread apart the material and keep it away from the cutting edge as the cutter is reciprocated, the face 11 spreading the cloth as the cutter is pulled up against the stitching, and the face 12 spreading the cloth when the cutter is forced down against the stitching.

In Fig. 6 is shown a modification of my invention as it may be applied to a sewing machine. While the cutting device used for this purpose may be somewhat varied, I prefer to use a cutting or ripping rod of about the size of a large sized sewing machine needle for this purpose, which is reciprocated by the needle bar, the ripping rod being provided with a cutting edge and spreading shoulders like the cutting edge and spreading shoulders just described. In the particular construction shown, I provide such a ripping rod 14, this ripping rod being formed with a cutting edge 15 and spreading shoulders, these spreading shoulders being formed at each end of the cutting edge and having beveled faces 16, 17, providing a wedge, the action of which spreads the material away from the cutting edge as the rod is reciprocated. This ripping rod 15 may be used in any sewing machine, being secured to and operated by the ordinary needle carrying bar, which is indicated at 18. To prevent the end of the rod from being pulled entirely out of the seam at each upward reciprocation, as would be the case with an ordinary needle bar, and thus render it liable not to be returned into the seam at the proper point owing to an accidental shifting of the material, or for any other reason, I provide for use with this rod a device for compensating for the extreme movement which would otherwise be given the rod by the needle bar. As shown, the rod 15 is carried in a sleeve 19, being secured therein in any suitable manner. The sleeve 19 is adapted to receive a rod 20, which rod is inserted in the needle bar of the machine. The sleeve 19 has a slot 21, in which slot is adapted to work a pin 22, which pin is carried on the rod 20. This pin prevents the needle from turning and throwing the cutting edge out of line with the seam. The rod 20 has a travel in the sleeve which is sufficient to take up the excess movement of the needle bar over that required to be given to the rod, and prevents the ripping rod from being lifted out of the seam. This affords a very efficient construction for use with sewing machines, by which the seam can be very quickly and accurately ripped.

What is claimed is:—

1. A seam cutting device of the character described, comprising a knife having a cutting edge, and a wedge shaped spreading device located behind and closely adjacent to the cutting edge for spreading the abutting edges of the material out of the path of the cutting edge as the latter is advanced to cut the seam.

2. A seam cutting device of the character described, comprising a knife having a cutting edge, a wedge shaped spreading device located behind and closely adjacent to the cutting edge for spreading the abutting edges of the material out of the path of the cutting edge as the latter is advanced to cut the seam, and guiding shoulders adjacent to the spreading device.

3. A seam cutting device of the character described, comprising a knife having a concave cutting edge, and a wedge shaped spreading device located behind and closely adjacent to the cutting edge for spreading the abutting edges of the material out of the path of the cutting edge as the latter is advanced to cut the seam.

4. A seam cutting device of the character described, comprising a knife having a cutting edge, and spreading shoulders having beveled faces located behind and closely adjacent to the cutting edge and forming a wedge for spreading the abutting edges of the material apart as the cutting edge is advanced to cut the seam, said shoulders being of least thickness directly behind the cutting edge and the thicker portions of the shoulders forming guides for guiding the cutting edge as it is advanced to sever the seam.

5. A seam cutting device of the character described, comprising a knife having a plurality of cutting edges, two of said edges lying in the same plane with their cutting portions facing in opposite directions, and spreading shoulders having beveled faces forming wedges located behind each cutting edge for spreading the material out of the path of the edge, said shoulders being of greater thickness at their top and bottom than at their center, the bottom portion of said shoulders forming a guide for holding the cutting edge against the seam.

6. A seam cutting device of the character described, comprising a knife having a plurality of cutting edges, two of said edges extending transversely of a third edge and facing in opposite directions, and spreading shoulders having beveled faces located closely adjacent to each of said cutting edges, the spreading shoulders for said two oppositely facing cutting edges being of least thickness directly behind the cutting edge and the thicker portions of said shoulders forming guides for guiding the cutting edges as they are advanced to sever the seam.

7. A seam cutting device of the character described, having a cutting edge, and a wedge shaped spreading device at each end of the cutting edge and adapted when the cutting edge is reciprocated across the seam to spread the abutting edges of the material apart at the end of each reciprocating movement.

In testimony whereof, I have hereunto set my hand, in the presence of two subscribing witnesses.

WESLEY TRAFFORD.

Witnesses:
J. A. GRAVES,
P. B. PHILIPP.